(12) United States Patent
Kawamura et al.

(10) Patent No.: US 8,924,176 B2
(45) Date of Patent: Dec. 30, 2014

(54) INDUSTRIAL MACHINE

(75) Inventors: Kanae Kawamura, Tochigi (JP);
Nobuyoshi Machida, Kanagawa (JP);
Shigeo Kikuchi, Tochigi (JP); Mitsuru Fukuda, Tochigi (JP)

(73) Assignee: Mitutoyo Corporation, Kanagawa (JP)

( * ) Notice: Subject to any disclaimer, the term of this patent is extended or adjusted under 35 U.S.C. 154(b) by 710 days.

(21) Appl. No.: 13/155,926

(22) Filed: Jun. 8, 2011

(65) Prior Publication Data

US 2011/0313706 A1 Dec. 22, 2011

(30) Foreign Application Priority Data

Jun. 18, 2010 (JP) ................................. 2010-138968

(51) Int. Cl.
| | | |
|---|---|---|
| G01C 19/00 | (2013.01) | |
| G01C 25/00 | (2006.01) | |
| G01D 18/00 | (2006.01) | |
| G01F 25/00 | (2006.01) | |
| G01C 9/00 | (2006.01) | |
| G01C 17/00 | (2006.01) | |
| G01B 21/04 | (2006.01) | |

(52) U.S. Cl.
CPC .................................. G01B 21/045 (2013.01)
USPC ......................................... 702/104; 702/152

(58) Field of Classification Search
CPC ...... G01B 21/045; G01C 19/00; G01C 21/00; G01C 21/26
USPC ................................................. 702/104, 152
See application file for complete search history.

(56) References Cited

U.S. PATENT DOCUMENTS

2002/0123858 A1* 9/2002 Ogura et al. .................. 702/152
2005/0234671 A1 10/2005 Morfino

FOREIGN PATENT DOCUMENTS

| CN | 1374502 A | 10/2002 |
|---|---|---|
| EP | 0 275 428 A2 | 7/1988 |
| EP | 1 239 263 A2 | 9/2002 |
| GB | 2 265 324 A | 9/1993 |
| JP | A-2002-257535 | 9/2002 |
| JP | A-2003-114116 | 4/2003 |
| JP | A-2004-325120 | 11/2004 |
| JP | A-2009-300180 | 12/2009 |

OTHER PUBLICATIONS

Extended European Search Report issued in European Patent Application No. 11170408.6 dated Sep. 16, 2011.
Jan. 21, 2014 Office Action issued in Chinese Patent Application No. 201110167570.6 (w/English Translation).
Nov. 12, 2013 Office Action issued in Japanese Application No. 2010-138968 (w/English Translation).

* cited by examiner

*Primary Examiner* — John Breene
*Assistant Examiner* — Manuel Rivera Vargas
(74) *Attorney, Agent, or Firm* — Oliff PLC

(57) ABSTRACT

According to an exemplary embodiment, an industrial machine includes: a movement mechanism configured to move along a specific axis direction; a controller configured to control the movement mechanism; and an angle detector configured to detect an angle of the movement mechanism about an axis perpendicular to the specific axis direction. The controller comprises: an angular error acquisition section configured to acquire angular errors of the movement mechanism for respective positions of the movement mechanism based on the angle detected when the movement mechanism is moved; a parameter generator configured to generate respective straightness correction parameters for correcting straightness errors of the movement mechanism in the specific axis direction by integrating the angular errors at the respective positions of the movement mechanism; and a correction section configured to correct movement errors of the movement mechanism based on the straightness correction parameters.

2 Claims, 3 Drawing Sheets

INDUSTRIAL MACHINE

This application claims priority from Japanese Patent Application No. 2010-138968, filed on Jun. 18, 2010, the entire content of which is hereby incorporated by reference.

FIELD OF THE INVENTION

The present disclosure relates to an industrial machine.

DESCRIPTION OF RELATED ART

Industrial machines are known, such as measurement instruments, machine tools and robots, provided with a movement mechanism that moves along a specific axis direction and a controller for controlling the movement mechanism (see, for example, Patent Document 1). The position measuring device (industrial machine) of Patent Document 1 is provided with a platen having a reference surface, moving means (a movement mechanism) that moves along a specific axis direction parallel to the reference surface, and positional coordinate calculation means (a controller).

The position measuring device described in Patent Document 1 employs a kinematic model of the position measuring device to classify each error (referred to below as geometric errors) according to geometric causes of a movement error in the position measuring device. Each of the geometric errors of the position measuring device is measured in advance when the position measuring device is manufactured, and correction parameters of the geometric errors are calculated for each of the geometric errors. The position measuring device enhances a measurement precision by correcting a movement error (referred to below as a precision spatial correction) according to each of the geometric correction parameters and the kinematic model of the position measuring device. However, since changes occur to each of the geometric errors due to being affected by changes in temperature of the environment in which the position measuring device is being used and by changes to the position measuring device with the passage of time, sometimes an appropriate precision spatial correction cannot be performed even though each of the geometric errors is measured in advance when the position measuring device is manufactured and a correction parameter for each geometric errors is calculated. This is due to a lack of consideration to changes that occur in the geometric errors.

In the position measuring device Patent Document 1, by attaching biaxial goniometers to the reference surface and the movement means, respectively, a rolling error and a pitching error of the geometric errors are re-measured. An appropriate precision spatial correction can then be made with taking into account changes in the rolling error and the pitching error by re-performing the precision spatial correction. Note that rolling error is an angular error of the movement means about an axis along the movement direction of the movement means, and the pitching error is another angular error of the movement means about an axis perpendicular to the movement axis direction of the movement means and parallel to the reference surface.

Patent Document 1: Japanese Patent Application Publication No. JP-A-2002-257535

However, in the position measuring device of Patent Document 1, since a straightness error of the geometric errors is not re-measured, the appropriate correction cannot be made for the movement error caused by the straightness error. Namely, the appropriated precision spatial correction that takes into account changes in the straightness error cannot be made. In order to address the issue, consideration might be given to suppressing changes in the straightness error, due to being affected by changes in temperature of the environment in which the position measuring device is used and changes to the position measuring device with the passage of time, by, for example, introducing a high cost conditioning equipment for the environment in which the position measuring device is used or increasing the rigidity of the movement means. However, this would result in an increase in manufacturing cost and running cost.

Alternatively, consideration might be given, for example, to attaching the movement means to a platen made from a stone material or the like and to increasing a thickness of the platen in order to suppress changes in straightness error. However, when the movement means is attached to a platen of a bed plane made from concrete, changes in straightness error cannot be suppressed. Revised calculation of the correction parameters for the straightness error (referred to below as straightness error correction parameters) by re-measuring the straightness error using, for example, a straight edge and a laser length detector might also be considered. However, since an instrument such as the straight edge and the laser length detector needs to be employed, this would result in an increase in the cost and the operation time for the precision spatial correction.

Other aspects and advantages of the invention will be apparent from the following description, the drawings and the claims.

SUMMARY OF INVENTION

Illustrative aspects of the present invention provide an industrial machine capable of performing an appropriate precision spatial correction even when affected by changes in temperature of the environment of use and/or changes occurring with the passage of time.

According to a first aspect of the invention, an industrial machine includes: a movement mechanism configured to move along a specific axis direction; a controller configured to control the movement mechanism; and an angle detector configured to detect an angle of the movement mechanism about an axis perpendicular to the specific axis direction, wherein the controller comprises: an angular error acquisition section configured to acquire angular errors of the movement mechanism for respective positions of the movement mechanism based on the angle detected when the movement mechanism is moved; a parameter generator configured to generate respective straightness correction parameters for correcting straightness errors of the movement mechanism in the specific axis direction by integrating the angular errors at the respective positions of the movement mechanism; and a correction section configured to correct movement errors of the movement mechanism based on the straightness correction parameters.

BRIEF DESCRIPTION OF THE DRAWINGS

Exemplary embodiments of the present invention will be described in detail based on the following figures, wherein.

DETAILED DESCRIPTION OF EXEMPLARY EMBODIMENTS

Explanation follows regarding a first exemplary embodiment based on the drawings.

[Outline Configuration of Three-Dimensional Measurement Instrument]

Figure 1:
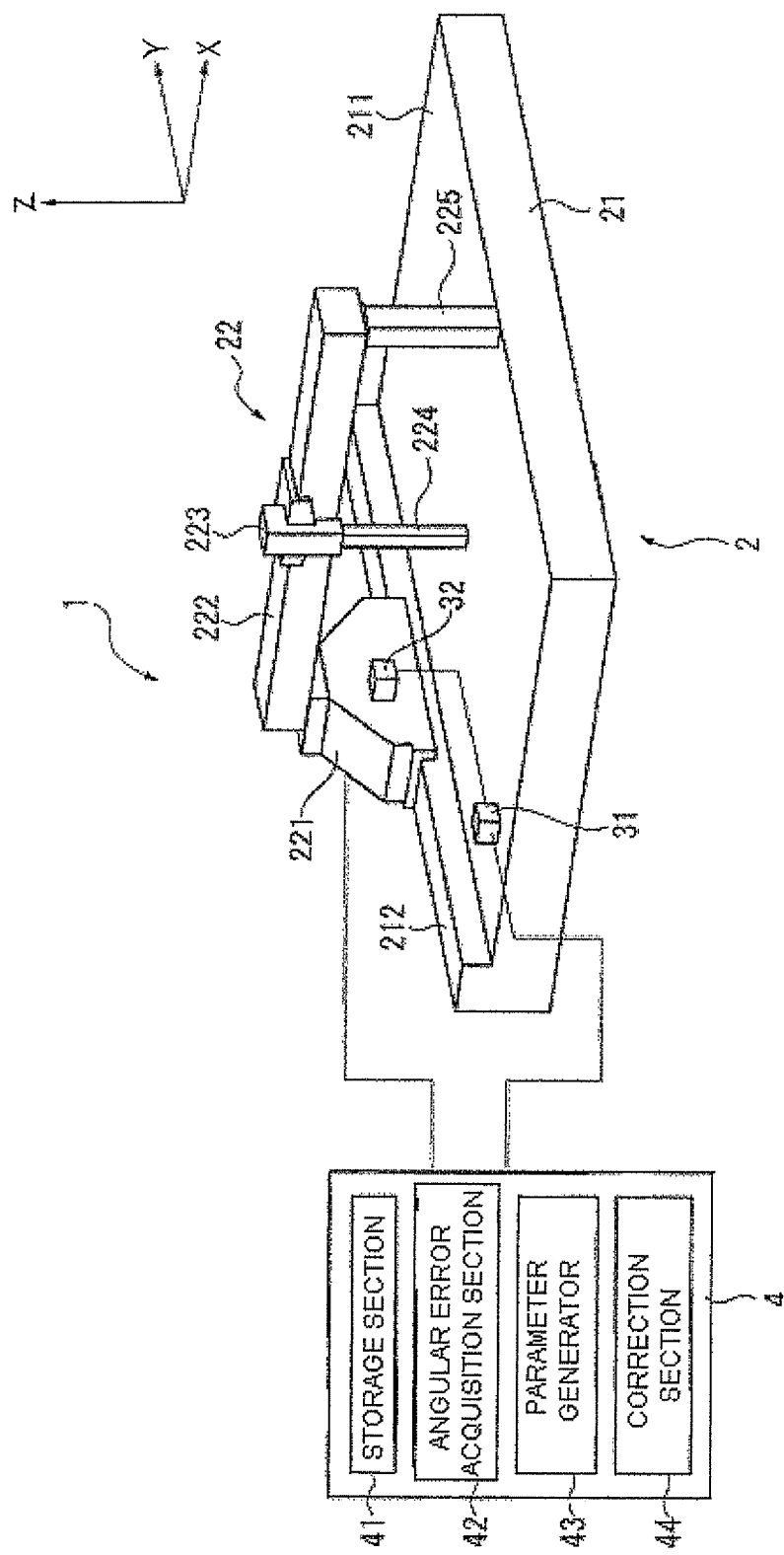
FIG. 1 is a diagram showing an outline configuration of a three-dimensional measurement instrument according to an exemplary embodiment.

FIG. 1 is a diagram showing an outline configuration of a three-dimensional measurement instrument 1 according to a first exemplary embodiment. In the following explanation, an up direction of FIG. 1 is a +Z axis direction, and two axes perpendicularly intersecting the Z axis direction are an X axis and a Y axis, respectively. The three-dimensional measurement instrument 1 as shown in FIG. 1, serving as an industrial machine, includes a main body 2, two biaxial goniometers 31, 32 attached to the main body 2, and a controller 4 for controlling the main body 2 and the biaxial goniometers 31, 32.

The main body 2 includes a base 21 and a slide mechanism 22 provided to the base 21. The base 21 is formed in a rectangular plate shape having a flat plane 211 for mounting objects to be measured (not shown in the drawings). A guide rail 212 is formed at the −X axis direction side of the base 21, projecting out towards the +Z axis direction side and formed in a straight line along the Y axis direction. The guide rail 212 guides the slide mechanism 22 along the Y axis direction.

The slide mechanism 22 includes: a column 221 attached to the guide rail 212 and provided so as to be movable over the guide rail 212 along the Y axis direction; a beam 222 supported by the column 221 and extending along the X axis direction; a slider 223 formed in a tube shape extending along the Z axis direction and provided so as to be movable over the beam 222 along the X axis direction; and a ram 224 inserted in the slider 223 and provided movable along the Z axis direction in the slider 223.

A support pillar 225 extending out along the Z axis direction is formed at the +X direction end of the beam 222. A gauge head (not shown in the drawings) for measuring a measured object is attached at the −Z axis direction end of the ram 224. The slide mechanism 22 is equipped with a drive section (not shown in the drawings) for driving the column 221, the slider 223 and the ram 224 so as to move the gauge head along the X, Y, Z axis directions under control from the controller 4. In the explanation that follows, the movement mechanism of the exemplary embodiment is configured by the guide rail 212 and the column 221, for moving in a specific axis direction (Y axis direction).

The biaxial goniometer 31 is attached to the flat plane 211 and detects the angles of the flat plane 211 about the X and Y axes with reference to its respective initial angles. The biaxial goniometer 32 is attached to the column 221 and detects the angle of the column 221 about the X and Y axes, respectively, with reference to its initial angles. Namely, the biaxial goniometer 32 functions as angle detection means (an angle detector) for detecting the angle of the movement mechanism about an axis (X axis direction) perpendicular to the specific axis direction (the Y axis direction) and parallel to the flat plane 211 to which the biaxial goniometer 31 is attached. Any errors in the angle of the column 221 about the respective X, Y axis directions can be calculated by deriving differences between the angles detected by the biaxial goniometer 32 and the angles detected by the biaxial goniometer 31. In the exemplary embodiment, the angles detected by the biaxial goniometers 31, 32 when the column 221 has been moved to the −Y arrow direction end are employed as the initial angles.

The controller 4 includes: a Central Processor Unit (CPU), a storage section 41 configured with memory; an angular error acquisition section 42; a parameter generator 43 for generating straightness correction parameters for correcting straightness errors of the movement mechanism in the Y axis direction (referred to below simply as straightness errors); and a correction section 44 for correcting movement errors of the movement mechanism based on the straightness correction parameters generated by the parameter generator 43, namely for performing a precision spatial correction.

The storage section 41 stores data used by the controller 4, and stores each of the geometric errors of the three-dimensional measurement instrument 1 pre-measured at the time the three-dimensional measurement instrument 1 was manufactured (such as, for example, pitching errors and straightness errors), and stores correction parameters for each of the geometric errors calculated based on these respective geometric errors. The methods employed for measuring each of the movement errors and the calculation method of the correction parameters for each of the geometric errors is similar to the respective methods employed in the position measuring device of Patent Document 1. A correction program for generating the straightness correction parameters and performing the precision spatial correction is also stored in the storage section 41.

The angular error acquisition section 42 acquires angular errors (pitching errors) of the column 221 for each of the positions of the column 221 based on the difference between the angle about the X axis detected with the biaxial goniometer 32 and the angle about the X axis detected with the biaxial goniometer 31 when the column 221 is moved from one end located in the −Y arrow direction side to the other end located in the +Y axis direction side. The parameter generator 43 generates the straightness correction parameters by integrating the respective pitching errors acquired by the angular error acquisition section 42 at the respective positions of the column 221.

Figure 2:
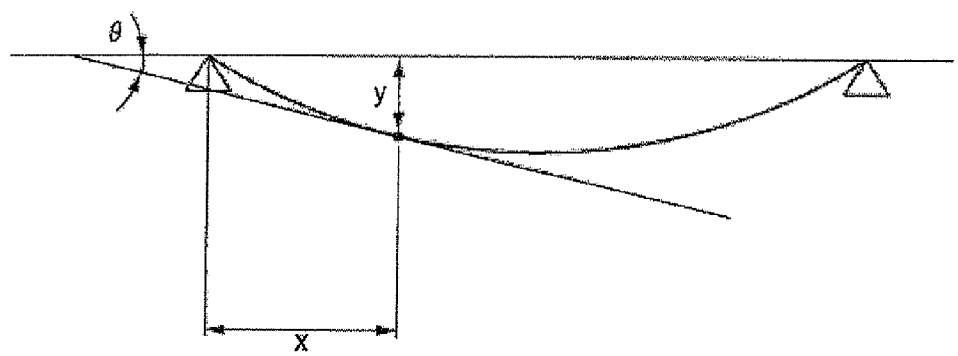
FIG. 2 is a diagram showing a relationship between a deflection angle and a deflection amount of a movement mechanism according to the exemplary embodiment.

FIG. 2 is a diagram showing a relationship between a deflection angle θ and a deflection amount y of the movement mechanism. In order to simplify explanation, the movement mechanism is considered as a simple beam, the relationship between the deflection angle θ and the deflection amount y of the movement mechanism when the position of the movement mechanism is X is generally the relationship shown in FIG. 2, and can be expressed by Equation (1) below, wherein C is the constant of integration.

$$y = -\int \theta \, dx + C \qquad \text{Equation (1)}$$

Thus, the deflection amount y can be calculated by integrating, at position X, the deflection angle θ with respect to respective positions X. Namely, if the movement mechanism is the column 221, by integrating the pitching error (deflection angle) of the column 221 with respect to the respective positions of the column 221 at the position of the column 221, the straightness error (deflection amount) with respect the respective positions of the column 221 can be calculated.

Specifically, the parameter generator 43 calculates a change in the amount of the respective straightness errors by integrating, at each position of the column 221, the difference between the pitching error pre-stored in the storage section 41 and the pitching error acquired by the angular error acquisition section 42. Note that since the initial angles of the biaxial goniometers 31, 32 serve as reference angles, the straightness error is 0 when the position of the column 221 is 0. Consequently, the constant of integration C of Equation (1) is 0. The parameter generator 43 then generates the straightness correction parameters by adding the straightness error stored in the storage section 41 to the change amount of the straightness error.

The correction section 44 performs a precision spatial correction based on the straightness correction parameters generated by the parameter generator 43.

Figure 3:
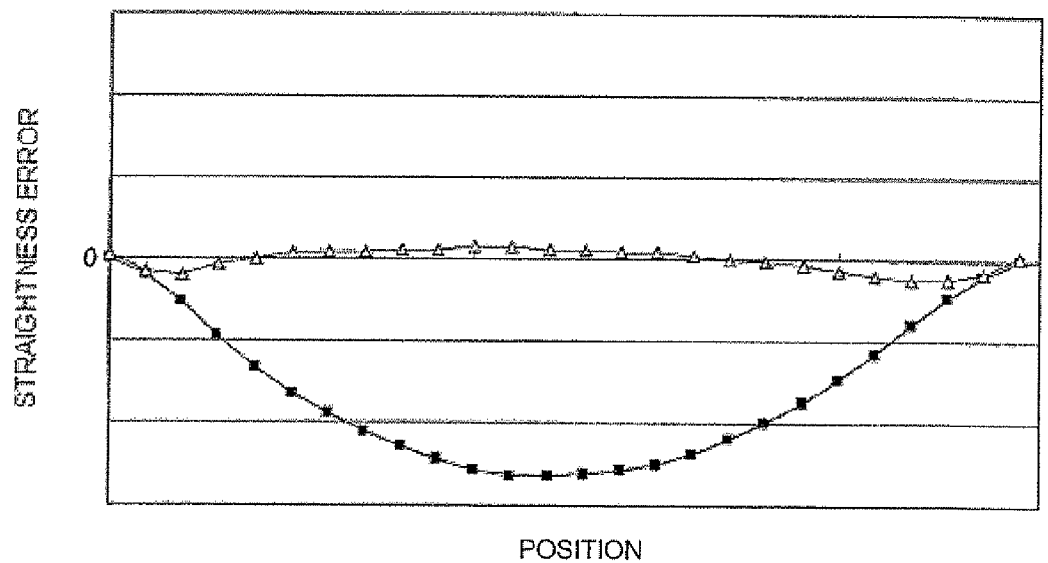
FIG. 3 is a graph showing straightness errors before and after performing a precision spatial correction by a correction section according to the exemplary embodiment.

FIG. 3 is a graph showing straightness errors before and after performing the precision spatial correction by the correction section 44. In FIG. 3, the vertical axis shows the straightness error and the horizontal shows the position of the column 221. The straightness errors after the precision spatial correction has been performed with the correction section 44 (shown by triangular marks in FIG. 3) is reduced in comparison to the straightness errors before the precision spatial correction is performed by the correction section 44 (shown by the square marks in FIG. 3).

[Precision Spatial Correction Method]

Figure 4:
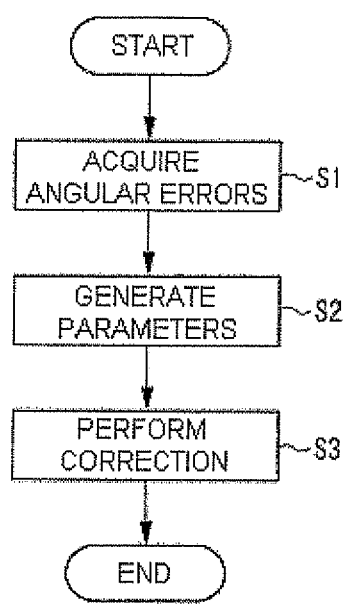
FIG. 4 is a flow chart showing a method of the precision spatial correction according to the exemplary embodiment.

Explanation now follows regarding a precision spatial correction method. FIG. 4 is a flow chart showing a precision spatial correction method. When the correction program stored in the storage section 41 is executed, the controller 4 executes the following steps S1 to S3, as shown in FIG. 4.

When the correction program is executed, the angular error acquisition section 42 controls the movement mechanism to move the column 221 and acquires the pitching errors (S1: angular error acquisition step). When the pitching errors have been acquired by the angular error acquisition step S1, the parameter generator 43 generates the straightness correction parameters (S2: parameter generation step). When the straightness correction parameters have been generated by the parameter generation step S2, the correction section 44 then performs a precision spatial correction (S3: correction step). The controller 4 thus generates the straightness correction parameters and performs the precision spatial correction by executing the steps S1 to S3.

Such an exemplary embodiment exhibits the following effects.

(1) The three-dimensional measurement instrument 1 is provided with the biaxial goniometers 31, 32. The parameter generator 43 generates the straightness correction parameters by integrating the pitching errors acquired by the angular error acquisition section 42 at respective positions of the movement mechanism, and the correction section 44 performs the precision spatial correction based on the straightness correction parameters generated by the parameter generator 43. Accordingly, the three-dimensional measurement instrument 1 can perform an appropriate precision spatial correction to account for changes in straightness error even when the three-dimensional measurement instrument 1 is affected by factors such as fluctuations in the temperature of the usage environment and changes due to the passage of time.

(2) The parameter generator 43 can generated the straightness correction parameters by adding the straightness error of the movement mechanism at the time of manufacturing the three-dimensional measurement instrument 1 to an amount of change of the straightness error. Hence the three-dimensional measurement instrument 1 can appropriately correct for movement errors caused by small undulations of the guide rail 212 arising due to operation etc., and also movement errors caused by large undulations of the guide rail 212 due to differences in thermal expansion coefficients.

[Modifications to Exemplary Embodiments]

The invention is not limited to the above exemplary embodiment, and the invention includes for example various modifications and improvement within a scope to achieve the objective of the invention. For example, in the above exemplary embodiment, the movement mechanism is configured by the guide rail 212 and the column 221 and moves along the specific axis direction (Y axis direction). As an alternative, for example, the movement mechanism may be configured by the beam 222 and the slider 223 and moves along the X axis direction. Note that in such cases the biaxial goniometers may be attached to the flat plane 211 of the base 21 and the slider 223, respectively. In other words, it is sufficient to have a configuration in which the movement mechanism moves along a specific axis direction.

In the exemplary embodiment, the three-dimensional measurement instrument 1 is provided with the two biaxial goniometers 31, 32 and calculates the angular errors of the column 221 about the X and Y axes by deriving the difference between the angles detected by the biaxial goniometer 32 and the angles detected by the biaxial goniometer 31. However, configuration may be made such that, for example, when the angle that would be detected by the biaxial goniometer 31 is already known, the three-dimensional measurement instrument 1 is provided with the biaxial goniometer 32 alone. In other words, configuration may be made with angle detection means (angle detector) that detects the angle of the movement mechanism about an axis perpendicular to a specific axis direction, such that the angular errors of the movement mechanism can be acquired by an angular error acquisition section.

In the exemplary embodiment, the parameter generator 43 generates the straightness correction parameters by adding the change amounts in straightness error to a straightness error stored in the storage section 41. However configuration may be made such that a parameter generator calculates the straightness errors by integrating angular errors of the movement mechanism acquired by an angular error acquisition section at the respective positions of the movement mechanism, and then generates straightness correction parameters based on these calculated straightness errors. In the above exemplary embodiment, the three-dimensional measurement instrument 1 is illustrated as an example of the industrial machine, however application may be made to another measurement instrument such as a profile measurement instrument, or another industrial machine such as a machine tool, or robot. In other words, appropriate application can be made to any industrial machine provided with a base, movement mechanism and controller.

What is claimed is:

1. An industrial machine comprising:
   a movement mechanism configured to move along a specific axis direction;
   a controller configured to control the movement mechanism; and
   an angle detector configured to detect an angle of the movement mechanism about an axis perpendicular to the specific axis direction,
   wherein the controller comprises:
   an angular error acquisition section configured to acquire angular errors of the movement mechanism for respective positions of the movement mechanism based on the angle detected when the movement mechanism is moved;
   a parameter generator configured to generate respective straightness correction parameters for correcting straightness errors of the movement mechanism in the specific axis direction by mathematically integrating the angular errors at the respective positions of the movement mechanism; and a correction section configured to correct movement errors of the movement mechanism based on the straightness correction parameters, the controller comprising a storage section configured to store the angular errors of the movement mechanism and the straightness errors of the movement mechanism, and the parameter generator generating the straightness correction parameters by calculating an amount of change in the respective straightness errors by integrating, at the respective positions of the movement mechanism, a difference between a pitching error of the movement mechanism pre-stored in the storage section and a pitching error of the movement mechanism acquired by the angular error acquisition section, and by adding the amount of change in the respective straightness errors to a straightness error of the movement mechanism pre-stored in the storage section.

2. The industrial machine according to claim 1, wherein the industrial machine is a measurement instrument provided with the movement mechanism and the controller.

* * * * *